United States Patent [19]
Blank

[11] 3,876,768
[45] Apr. 8, 1975

[54] STERILIZATION OF SOFT, HYDROPHILIC ACRYLATE AND METHACRYLATE COPOLYMER MATERIALS

[75] Inventor: Izhak Blank, Haifa, Israel

[73] Assignee: Hydrophilics International, Inc., New York, N.Y.

[22] Filed: Feb. 28, 1974

[21] Appl. No.: 446,643

Related U.S. Application Data

[63] Continuation-in-part of Ser. No. 303,995, Nov. 6, 1972, , which is a continuation-in-part of Ser. No. 253,483, May 15, 1972, abandoned.

[52] U.S. Cl. ............... 424/128; 424/149; 424/249
[51] Int. Cl. ............................................ A01n 11/00
[58] Field of Search ................. 424/149, 249, 128

[56] References Cited
UNITED STATES PATENTS

| | | | |
|---|---|---|---|
| 2,976,576 | 3/1961 | Wichterle et al. | 264/49 |
| 3,236,726 | 6/1966 | Ross | 424/128 |
| 3,240,709 | 3/1966 | Rankin | 252/106 |
| 3,468,803 | 9/1969 | Knapp et al. | 424/128 |
| 3,488,420 | 1/1970 | Keast et al. | 424/249 |
| 3,554,915 | 1/1971 | Keay et al. | 424/128 |

FOREIGN PATENTS OR APPLICATIONS

| | | |
|---|---|---|
| 1,367,383 | 7/1964 | France |
| 6,411,362 | 4/1965 | Netherlands |

Primary Examiner—Albert T. Meyers
Assistant Examiner—Douglas W. Robinson
Attorney, Agent, or Firm—Ryder, McAulay, Fields, Fisher & Goldstein

[57] ABSTRACT

Soft, hydrophilic acrylate and methacrylate copolymer materials are sterilized by immersing them in a solution containing small, but effective amounts of a material which releases active halogen in solution, but is non-damaging to the eye in concentrations effective for sterilization. A particularly effective material is chlorinated trisodium phosphate. The concentrataion of the sterilant material should be such that it releases halogen in amounts of from about 2 parts per million to 250 parts per million. The technique is particularly useful for sterilization of soft, hydrophilic acrylate and methacrylate contact lenses.

11 Claims, No Drawings

STERILIZATION OF SOFT, HYDROPHILIC ACRYLATE AND METHACRYLATE COPOLYMER MATERIALS

CROSS REFERENCE TO RELATED APPLICATIONS

This application is a continuation in part of my co-pending application, Ser. No. 303,995, filed Nov. 6, 1972, now abandoned, for "STERILIZATION OF SOFT CONTACT LENSES," which was a continuation in part of application Ser. No. 253,483, filed May 15, 1972, now abandoned, for "STERILIZATION OF SOFT CONTACT LENSES," both applications being assigned to the same assignee as the present invention.

BACKGROUND OF THE INVENTION

Recently considerable attention has been given to the so-called soft contact lenses. Such contact lenses are particularly valuable as they avoid the irritation caused by the older, hard contact lenses which were hydrophobic in nature. The eye is normally covered with a layer of fluid with which the hydrophobic contact lenses may interfere and cause irritation, while the hydrophilic lenses allow the layer of fluid to circulate. Patents describing this type of lens and the copolymers to be employed in them are, for example, U.S. Pat. No. 2,976,576 — Wichterle, U.S. Pat No. 3,220,960 — Wichterle, and U.S. Pat. No. 3,221,083 — Crandon. Further, materials for soft, hydrophilic contact lenses are described in my co-pending application Ser. No. 139,545, filed May 3, 1971, now U.S. Pat. No. 3,728,317, and assigned to the same assignee as the present invention wherein the material is a bulk copolymer of from 75 to 92% methylmethacrylate and from 8 to 25% acrylic acid where the acid groups of the acrylic acid have been neutralized.

With the hydrophilic contact lenses now in use, sterilization has proved a problem. The hydrophobic contact lenses were easily sterilizable as they had smooth, hard surfaces which are not penetrated by microorganisms. By their very nature, the hydrophilic contact lenses are provided with a plurality of internal paths for fluid transfer and, if the lenses are not properly cleaned, bacteria and other infection causing organisms can collect in these fluid transfer areas.

Because of the plurality of internal paths for fluid transfer in a soft, hydrophilic copolymer material, a cleaning solution which might be capable of use with a hydrophobic contact lens, where it is not absorbed, cannot necessarily be used with the porous, hydrophilic materials. The presence of these internal paths provides both the usefulness of the soft, hydrophilic copolymer materials and, at the same time, makes their sterilization, particularly when they are to be used as contact lenses, much more difficult.

The problem of sterilization of hydrophilic lenses has received considerable attention. For example, the Jan. 4, 1972 issue of *The Wall Street Journal*, on page 32, refers to studies being conducted in Canada and Germany, both of which showed ineffective sterilization of the contact lenses then on the market. Among the materials employed for sterilization are hydrogen peroxide, thimerosol, benzalkonium chloride and chlorhexidin. These have proven ineffective, however, for a variety of reasons.

In order to be useful as a sterilizant for soft contact lenses, the sterilizing material must meet three criteria:

1. It must effectively kill pathogens.
2. It must be harmless to the eye.
3. It should not affect the lens.

Of the materials referred to above which had previously been employed for sterilization of soft contact lenses, each failed to meet at least one of the requirements. Hydrogen peroxide, if brought into contact with the eye, may cause severe burns. While thimerosol and chlorhexidin are bacteristats, they are not bactericides. The benzalkonium chloride and similar materials accumulate in the lens when employed over a period of time, and cause irritation to the eye and opacity of the lens.

Other sterilization methods have included autoclaving and gas sterilization with ethylene oxide. While autoclaving should provide complete sterilization, it affects certain types of lenses, and if the lens is not totally cleaned before autoclaving, the proteinaceous material from the eye fluid will precipitate on the lens. After repeated treatments, the clarity of the lens is impaired. Ethylene oxide, which is gaseous at room temperature, is flammable and toxic, so that it can be used only by trained personnel. Further, as it is highly reactive, it may incorporate in the lens polymer structure and thus modify it.

SUMMARY OF THE INVENTION

In accordance with the present invention, it has unexpectedly been discovered that dilute solutions of materials which release active halogen, particularly chlorine, in solution, but are non-damaging to the eye in concentrations effective for sterilization, such as chlorinated trisodium phosphate, are effective in sterilizing soft, hydrophilic acrylate and methacrylate copolymer materials, while having no effect on the eye and without affecting the materials. In particular, the soft, hydrophilic acrylate and methacrylate copolymer materials can be in the form of soft, contact lenses.

The chlorinated trisodium phosphate is used in solution in small, but effective amounts, preferably concentrations giving approximately 2 to 250 parts per million, active chlorine. More preferably, the concentration is from 5 to 100 ppm active chlorine, most preferably from 5 to 25 ppm. The solvent for the chlorine releasing material is preferably water or isotonic saline solution. That these materials should be effective in sterilizing the soft, hydrophilic acrylate and methacrylate copolymer materials, without affecting the copolymer, is particularly surprising as only slightly greater concentrations, e.g., 1,000 parts per million, act to degrade and destroy the copolymer material so that it is unusable, though sterile. Among other halogen releasing materials which can be used are the alkali metal hypochlorites, alkali metal dichloro-s-triazinetriones, trichloro-s-triazinetrione, and isocyanuric acid.

To employ the sterilants of the present invention, the soft, hydrophilic acrylate and methacrylate copolymers are immersed in a solution of the material, such as the chlorinated trisodium phosphate, for a period of time sufficient to destroy bacteria which may have accumulated in or on the copolymer material. Generally, a period of one hour will be sufficient. If desired, the copolymer material can be allowed to remain in the solution overnight. The copolymer material is then immersed in a saline solution to remove the chlorinated trisodium phosphate and the copolymer material, particularly in the form of a contact lens, can then be placed in the eye. While this saline immersion step is desired, it is not essential, as the chlorinated trisodium phosphate, in the concentration used, will have little or no deleterious effect upon the eye.

The sterilizing solution can be employed with equal effect upon the various soft, hydrophilic copolymer material formulations known in the art. These are described, for example, in the various patents previously referred to, including that of my co-pending application. Each of these patents describes a soft, hydrophilic copolymer material selected from the class consisting of acrylate and methacrylate copolymers. For example, my prior patent, U.S. Pat. No. 3,728,317, describes a bulk copolymer of from 75 to 92% methylmethacrylate and from 8 to 25% acrylic acid where the acid groups of the acrylic acid have been neutralized. In addition, the copolymer may contain cross-linking agents, such as glycol-dimethacrylate, allyl methacrylate, and divinylbenzene in amounts from 0.5 to 1%. Further, plasticizers including butyl acrylate, 2-ethylhexyl methacrylate, stearyl acrylate, and other long-chain esters of acrylic and methacrylic acid may be incorporated into the copolymer in amounts of up to about 20%, by weight. Wichterle in his U.S. Pat. No. 2,976,576 describes soft, hydrophilic polymeric materials obtained by the polymerization of hydrophilic, water soluble monomers in such a way as to form a cross-linked three-dimensional network. Preferred starting materials, as set forth in that patent, are methacrylates of alcohols which contain hydrophilic groups in the chain. He also points out that the methacrylates may be replaced by acrylates which yield polymeric hydrogels with similar properties and a large number of such acrylate and methacrylate monomers, capable of polymerization or copolymerization to the soft, hydrophilic material are set forth. The acrylate and methacrylate monomers include both monofunctional monomers with ionizable hydrophilic groups, such as, dimethylamino ethylmethacrylate, piperidinoethyl methacrylate, morpholinoethyl methacrylate, methacrylyl glycolic acid, and free methacrylic acid; and monofunctional monomers with non-ionizable hydrophilic groups, such as, monomethacrylates of glycols, glycerol, and other polyhydroxylic compounds, and monomethacrylates of di- and poly-alkylene glycols. The polyfunctional monomers which are included within the raw material for formation of the copolymer of Wichterle, U.S. Pat. No. 2,976,576, include those with ionizable hydrophilic groups, such as, triethanolamine dimethacrylate, triethanolamine trimethacrylate, and tartaric acid dimethacrylate, along with polyfunctional monomers having non-ionizable hydrophilic groups, such as triethylene glycol dimethacrylate, and the dimethacrylate of bis-hydroxyethyl acetamide. Additional acrylates and methacrylates for use in forming soft, hydrophilic polymeric and copolymeric materials are set forth in Wichterle's U.S. Pat. No. 3,220,960. The starting materials for the copolymers of Wichterle U.S. Pat. No. 3,220,960 are the esters of acrylic and methacrylic acids with alcohols having hydrophilic groups which, after polymerization, impart hydrophilic properties to the polymer obtained. A major portion of a monoester of acrylic or methacrylic acid with a bifunctional alcohol which has an esterifiable hydroxyl group and at least one additional hydrophilic functional group is copolymerized in aqueous solution with a small amount of a diester of these acids and of an alcohol which has at least two esterifiable hydroxyl groups. Among the specific monomers mentioned for incorporation in the copolymer, beyond those mentioned in the first-referenced Wichterle patent, are the acrylates corresponding to the referenced methacrylates. Further, this patent shows the possible inclusion of linear, water-soluble polyamides and various esters of polycarboxylic acids. Crandon in U.S. Pat. No. 3,221,083 describes soft, hydrophilic copolymers, one of the components of which may be glycidyl methacrylate. Generally, this patent shows a copolymer formed from allyl diglycol carbonate in amounts of from 40 to 99%, along with from 1 to 60% of one or more vinyl-type monomers including maleic anhydride and glycidyl methacrylate. Further, methyl methacrylate may be incorporated into the overall composition, and one example of a polymer includes from 40 to 70% of the allyl diglycol carbonate, from 30 to 60% methyl methacrylate, and from 1 to 10% maleic anhydride. The sterilants and methods of the present invention are equally applicable to these various acrylate and methacrylate polymers and copolymers.

DESCRIPTION OF THE PREFERRED EMBODIMENTS

In accordance with the present invention, soft hydrophilic acrylate and methacrylate polymers and copolymers, particularly in the form of contact lenses, are treated with a solution of the halogen releasing materials containing from 2 to 250 parts per million active halogen, particulalrly chlorine, preferably 5 to 100 parts per million, most preferably 5 to 25 parts per million, in order to sterilize the polymeric material. The manner of application is not important, and the polymeric materials can be immersed in the solution in any desired manner. Obviously, other means of treatment can also be used.

The time of treatment, to ensure the sterilization effect, should be at least 15 minutes, and preferably one hour or more, depending upon the thickness of the polymeric material and the concentration of the solution. However, if desired, the polymeric material can be allowed to remain in the solution overnight. Subsequent to treatment with the halogen releasing material solution, the lens is flushed with a saline solution in order to remove the halogen releasing material, such as chlorinated trisodium phosphate. However, as the material, such as chlorinated trisodium phosphate in the concentrations employed, generally has no deleterious effect upon the eye, complete removal is not necessary. The treatment can be carried out at any desired temperature commensurate with the polymer characterics of the material, particularly in the form of a lens, but room temperature treatment is efficacious and therefore desirable.

The solution of chlorinated trisodium phosphate can be prepared from the powdered material or from tablets containing the active material alone, or in conjunction with sodium chloride. When the tablet contains sodium chloride, the ratio can be such as to give an isotonic salt solution containing the desired concentration of active chlorine.

The following examples show the effectiveness of treatment with the chlorinated trisodium phosphate, in accordance with the present invention in destroying bacteria. They also indicate that the material has no adverse effect upon the eye, nor upon the soft, hydrophilic contact lens material. In the examples, two microorganisms were employed, Staphylococcus aureus and Pseudomonas aeruginosa. The chlorinated tridosium phosphate employed contained 3.5% active chlorine. The hydrophilic contact lens material employed is a bulk copolymer formed from 85% methylmethacrylate and 15% acrylic acid, where the acrylic acid groups are neutralized after the copolymerication step employing sodium hydroxide, in accordance with my U.S. Pat. No. 3,728,317, previously referred to.

Example 1

Three chlorinated trisodium phosphate solutions in saline were prepared, Solution 1 containing 25 parts per million active chlorine, Solution 2 containing 5 parts per million active chlorine, and Solution 3 containing 0.5 parts per million active chlorine. Staphylococcus aureus in a concentration of $4 \times 10^5$ per ml. were added to each of the referenced solutions. Sheets of the hydrophilic copolymer material described above, in a thickness of 0.3 mm., were placed into the various solutions and the amounts of living bacteria were examined by culture (blood agar and McConkey) at intervals as indicated in Table 1.

Table 1

| Time (Minutes) | 15 Minute Rinse with Saline Solution | Solution 1 | Solution 2 | Solution 3 |
|---|---|---|---|---|
| 0 | Control-Growth | | | |
| 5 | No | 0 | 0 | 2 |
| 5 | Yes | 0 | 0 | 2 |
| 15 | No | 0 | 0 | 2 |
| 30 | No | 0 | 0 | 2 |
| 60 | No | 0 | 0 | 2 |
| 48 hrs. | No | 0 | 0 | 1 |

In the table above, the entries 0, 1 and 2 in the solution columns indicate, respectively, no growth, slight growth, and growth of the microorganism.

Example 2

In this example, the same series of steps were carried out as in Example 1, but employing Pseudomonas aeruginosa in a concentration of $4 \times 10^5$ per ml. in place of the Staphylococcus aureus. The results were as follows, with the designations in the solution column having the same meaning as those in Example 1.

Table 2

| Time (Minutes) | 15 Minute Rinse with Saline Solution | Solution 1 | Solution 2 | Solution 3 |
|---|---|---|---|---|
| 0 | Control-Growth | | | |
| 5 | No | 0 | 0 | 2 |
| 5 | Yes | 0 | 0 | 2 |
| 15 | No | 0 | 0 | 2 |
| 30 | No | 0 | 0 | 2 |
| 60 | No | 0 | 0 | 2 |
| 60 | Yes | 0 | 0 | 2 |
| 48 hrs. | No | 0 | 0 | 2 |

It can thus be seen, from a review of the two examples above, that concentrations of chlorinated trisodium phosphate providing more than 0.5 parts per million active chlorine are effective in preventing growth of the microorganisms Staphylococcus aureus and Pseudomonas aeruginosa, for sustained periods. On the other hand, when the solution concentration is reduced to 0.5 parts per million, growth of the microorganism proceeds.

Example 3

In this example lens sized pieces of the soft, hydrophilic contact lens material with a thickness of 0.3 mm. were immersed in a solution containing Staphylococcus aureus in a concentration of $4 \times 10^6$ and Psuedomonas aeruginosa in a concentration of $1.2 \times 10^6$ per ml. for a period of 5 minutes. After the lens material was removed from this microorganism suspension, it was placed in a solution containing chlorinated trisodium phosphate for varying periods and individual pieces were removed and cultured to determine the amounts of the microorganism which remained. The results are presented below in Tables 3 and 4 where 0 denotes no contamination, 3 denotes a slight contamination, 4 a moderate contamination, and 5 a heavy contamination of the particular microorganism.

Table 3

| Time (Minutes) | Measurement of Staphylococcus Aureus Chlorinated Trisodium Phosphate Solutions (Active Chlorine Concentration) | | | |
|---|---|---|---|---|
| | 100 ppm | 50 ppm | 10 ppm | 1 ppm |
| 0 | 5 | 5 | 5 | 5 |
| 15 | 0 | 0 | 5 | 5 |
| 30 | 0 | 0 | 3 | 5 |
| 45 | 0 | 0 | 0 | 5 |

Table 4

| Time (Minutes) | Measurement of Pseudomonas Aeruginosa Chlorinated Trisodium Phosphate Solutions (Active Chlorine Concentrations) | | | |
|---|---|---|---|---|
| | 100 ppm | 50 ppm | 10 ppm | 1 ppm |
| 0 | 4 | 4 | 5 | 5 |
| 15 | 0 | 0 | 4 | 5 |
| 30 | 0 | 0 | 3 | 5 |
| 45 | 0 | 0 | 0 | 3 |

It can be seen from the results in Tables 3 and 4 that concentrations greater than 1 part per million effectively kill active Staphylococcus aureus and Pseudomonas aeruginosa microorganisms within one hour. In fact, within 45 minutes, even with solution concentrations as low as 10 ppm active chlorine, the microorganisms present have been destroyed.

Employing the materials of Examples 1 and 4 of Wichterle, U.S. Pat. No. 2,976,576, similar results are obtained. Similarly, employing the same process with the materials of Examples 2 and 4 of Wichterle, U.S. Pat. No. 3,220,960, equally effective results are obtained.

Example 5

Two solutions of chlorinated trisodium phosphate were prepared, the first containing 50 parts per million active chlorine and the second 10 parts per million active chlorine. Four drops of each of these solutions were placed into the eyes of rabbits. With observation over a period of 48 hours, no pathological effect could be observed on macroscopic examination.

Example 6

A contact lens formed of the soft, hydrophilic copolymer described above, was immersed in a solution of chlorinated trisodium phosphate containing 50 ppm active chlorine. There was no significant change in either lens flexibility or hydration after 84 hours of continuous immersion.

In the following examples, water solutions of two different sterilants were employed. Sterilant A had the following active formulation:

| | |
|---|---|
| Chlorinated trisodium phosphate | 6.66% |
| Na$_3$PO$_4$·12H$_2$O | 93.34% |
| Sterilant B had the following formulation: | |
| Trisodium polyphosphate | 49.82% |
| Sodium chloride | 49.82% |
| Sodium dichlorocyanurate | 0.36% |

Except as otherwise indicated in the particular examples, the polymeric material treated was the same as that employed in Examples 1 thru 6. After contamination of the polymeric material with a microorganism and addition of sterilizing solution, one of two sampling techniques was employed. The first involved use of a standard loop, while the second involved immersing the polymeric material itself. The samples were than cultured on either solid agar or nutrient broth. In the tables in the examples below, the growth or lack of growth of the microorganisms is indicated by the following symbols:

| | |
|---|---|
| − | No growth |
| ± | Very slight growth |
| + | Slight growth |
| ++ | Growth |
| +++ | Strong growth |

EXAMPLE 7

In this example Proteus and Staphylococcus were employed in a total concentration of $10^5$/ml. The sterilants were added at levels of 1 to 20 parts per million active chlorine and the results are as indicated in Table 5 below:

TABLE 5

| Time (Min.) | Sampling Technique | Culture Medium | Sterilant A | | | | Sterilant B | | | |
|---|---|---|---|---|---|---|---|---|---|---|
| | | | 20 | 10 | 5 | 1 | 20 | 10 | 5 | 1 |
| 15 | loop | solid | + | + | + | + | − | − | − | − |
| 45 | loop | solid | − | − | ± | + | − | − | − | − |
| 60 | loop | solid | − | − | − | − | − | − | − | − |
| 60 | loop | broth | − | − | − | − | − | − | − | − |

It can thus be seen that within 60 minutes the microorganisms have been destroyed with all concentrations of the two sterilants between 1 and 20 parts per million.

EXAMPLE 8

The same techniques as in Example 7 were employed here except that a combination of a Candida and Pseudomonas in a total concentration of $10^5$/ml. was employed. The results of sterilization with sterilants A and B are shown below in Table 6:

TABLE 6

| Time (Min.) | Sampling Technique | Culture Medium | Sterilant A | | | | Sterilant B | | | |
|---|---|---|---|---|---|---|---|---|---|---|
| | | | 20 | 10 | 5 | 1 | 20 | 10 | 5 | 1 |
| 15 | loop | solid | ± | ± | ± | ± | − | ± | ± | ± |
| 60 | loop | solid | − | − | − | − | − | − | − | − |
| 60 | loop | broth | − | − | − | − | − | − | − | − |

In this case it can be seen that the microorganisms are again destroyed within 60 minutes employing either sterilant A or sterilant B with active chlorine concentrations of between 1 and 20 parts per million.

EXAMPLE 9

The same procedures were employed as in Example 7 except that a mixture of Esch.coli in a concentration of $10^5$/ml. and Bac.Subtilis in a concentration of 4,000/ml. were employed. The results of employing sterilants A and B are shown below in Table 7:

TABLE 7

| Time (Min.) | Sampling Technique | Culture Medium | Sterilant A | | | | Sterilant B | | | |
|---|---|---|---|---|---|---|---|---|---|---|
| | | | 20 | 10 | 5 | 1 | 20 | 10 | 5 | 1 |
| 15 | loop | solid | − | + | + | + | − | − | − | + |
| 45 | loop | solid | − | ± | + | + | − | ± | − | ± |
| 60 | loop | solid | − | + | − | − | − | − | − | + |
| 60 | loop | broth | − | + | + | + | − | − | − | + |

It can be seen from the table above that more than 10 parts per million active chlorine are required using sterilant A for the microorganism mixture set forth while more than 1 part per million of active chlorine is required when sterilant B is used.

EXAMPLE 10

In this example a contact lens blank of the polymeric material was contaminated in a microbial solution of Pseudomonas Aeruginosa in a concentration of $10^6$/ml. for a period of 15 minutes. The lens and 0.5 ml. of the solution were then transferred to a sterilizing solution containing either sterilant A or sterilant B. The results of the sterilization are indicated below in Table 8:

TABLE 8

| Time (Min.) | Sampling Technique | Culture Medium | Sterilant A | | | | Sterilant B | | | |
|---|---|---|---|---|---|---|---|---|---|---|
| | | | 20 | 10 | 5 | 1 | 20 | 10 | 5 | 1 |
| 10 | loop | solid | − | − | + | +++ | − | − | − | − |
| 15 | loop | solid | − | − | − | − | − | − | − | − |
| 25 | loop | broth | − | − | − | − | − | − | − | − |
| 30 | lens mat. | solid | − | − | − | − | − | − | − | − |
| 30 | lens mat. | broth | − | − | − | − | − | − | − | − |
| 45 | loop | solid | − | − | − | − | − | − | − | − |
| 50 | loop | broth | − | − | − | − | − | − | − | − |
| 55 | loop | solid | − | − | − | − | − | − | − | − |
| 60 | lens mat. | broth | − | − | − | − | − | − | − | − |
| 65 | loop | solid | − | − | − | − | − | − | − | − |

It can be seen from the results in the table above that within 15 minutes, employing active chlorine concentrations of between 1 and 20 parts per million with either sterilant A or sterilant B the microorganism is destroyed.

EXAMPLE 11

Employing the same technique as in Example 10 but using as the microorganism a mixture of Hem.Streptococcus in a concentration of $10^2$/ml. and Merella in a concentration of $10^4$/ml. the results shown in Table 9 were obtained.

TABLE 9

| Time (Min.) | Sampling Technique | Culture Medium | Sterilant A | | | | Sterilant B | | | |
|---|---|---|---|---|---|---|---|---|---|---|
| | | | 20 | 10 | 5 | 1 | 20 | 10 | 5 | 1 |
| 10 | loop | solid | − | − | ± | + | − | − | − | − |
| 15 | loop | solid | − | − | − | − | − | − | − | − |
| 25 | loop | broth | − | − | − | − | − | − | − | − |
| 30 | lens mat. | solid | − | − | − | − | − | − | − | − |
| 30 | lens mat. | broth | − | − | − | + | − | − | − | − |
| 45 | loop | solid | − | − | − | − | − | − | − | − |
| 50 | loop | broth | − | − | − | − | − | − | − | − |
| 55 | loop | solid | − | − | − | − | − | − | − | − |
| 60 | lens mat. | solid | − | − | − | − | − | − | − | − |
| 60 | lens mat. | broth | − | − | − | − | − | − | − | − |
| 65 | loop | solid | − | − | − | − | − | − | − | − |

It can be seen from the results above that within 45 minutes, employing concentrations of between 1 and 20 parts per million active chlorine, the microorganism is destroyed with either sterilant A or sterilant B. Similar results were obtained when the microorganism employed was Aspergillus rig. in a concentration of $10^4$/ml.

EXAMPLE 12

In this example a contact lens blank of the polymeric material was cut into four quarter segments and each segment was examined separately in the examination. A suspension of microorganisms in saline was prepared with the following materials where the number was determined by the "plate count" procedure:

| Staphylococcus aurens | $6 \times 10^5$ |
| Esch. coli | $4 \times 10^6$ |
| Pseudomonas Aeruginosa | $8 \times 10^6$ |
| Candida albicans | $3 \times 10^4$ |

The suspension was diluted 1:50 for use in this example. Petri dishes of blood agar, McConkey agar and Sabourand dextrose agar were used as the solid media, while test tubes with brain-heart infusion broth were used as fluid media. The solid media were inoculated by smearing of the sheet of polymeric material on the surface of the medium in the Petri dish, while the fluid media were inoculated by transferring the polymeric segments into the test tubes and leaving them there throughout the incubation period. Incubation was at 37°C and examination was conducted every 24 hours.

The segments of the polymeric material were suspended in 50 ml. of the diluted suspension of microorganisms and left for 24 hours at room temperature. The segments were then transferred to a beaker containing 25 ml. of solutions containing sterilant A or sterilant B. Inoculation with the segment was conducted at the following periods:
1. After rinsing for 5 seconds in the substances on solid media (control);
2. After 30 minutes in solid media;
3. After 60 minutes in solid media;
4. After 90 minutes in solid media;
5. After 120 minutes in solid media;
6. After 120 minutes on fluid media.

The results are indicated below in Tables 10 and 11. In those tables the − indicates a negative growth. On solid media the following symbols were employed:

| Confluent growth | +++ |
| 1 to 3 colonies | ± |
| 4 to 10 colonies | + |
| 11 to 30 colonies | ++ |

On fluid media, the following symbols apply:
| Scanty growth | ± |
| Quick and rich growth | ++ |

TABLE 10

| Details of Inoculation | | Sterilant A | | | |
|---|---|---|---|---|---|
| Time | Medium | 20 ppm | 10 ppm | 5 ppm | 1 ppm |
| 5" | solid | ++ | ++ | +++ | +++ |
| 30' | solid | ± | ± | +++ | +++ |
| 60' | solid | ± | ± | ++ | +++ |
| 90' | solid | − | − | ++ | +++ |
| 120' | solid | − | − | +± | +++ |
| 120' | fluid | − | − | ± | +++ |

TABLE 11

| Details of Inoculation | | Sterilant B | | | |
|---|---|---|---|---|---|
| Time | Medium | 20 ppm | 10 ppm | 5 ppm | 1 ppm |
| 5" | solid | ++ | ++ | +++ | +++ |
| 30' | solid | − | − | + | +++ |
| 60' | solid | − | − | − | +++ |
| 90' | solid | − | − | − | + |
| 120' | solid | − | − | − | ± |
| 120' | fluid | − | − | − | − |

It can be seen from the results above that employing sterilant A at 10 to 20 parts per million active chlorine concentration, sterilization is complete in about one hour. Employing sterilant B, with the same concentrations, sterilization is completed in about one-half hour, while at a concentration of 5 parts per million, sterilization is completed in about one hour.

Tests employing *Esch. coli*, *Pseudomonas Aerugirosa*, *Staph. aureus*, and *Candida albicans* with both powdered and tablet forms of sterilants A and B show that essentially the same results were obtained regardless of the form in which the material was employed.

EXAMPLE 13

In this example the polymer was made in the form of sticks and had the same basic formulation as those employed in the previous examples. However, the material was treated with ethylene imine as set forth in the copending application, Ser. No. 246,831, filed April 24, 1972, assigned to the same assignee as the present invention. These sticks were immersed for 24 hours in a suspension containing, per ml.:

| | |
|---|---|
| 6 × 10³ | *Staph. aureus*. |
| 2 × 10⁴ | *Esch. coli* |
| 7 × 10⁴ | *Pseudomanas Aeruginosa* |

The sticks were then transferred into solutions, respectively, of sterilant A and sterilant B containing 50 and 30 ppm active chlorine. Sterility was then examined by inoculating a "loopful" of the solution on 1 cm. long sheets of the stick which were cut with a sterile scissors. The inoculation was on blood agar and McConkey agar as solid media and brain heart-infusion broth as a fluid medium. The results of the sterilization are indicated in Table 12 below:

TABLE 12

| Details of Inoculation | | | Sterilant A | | Sterilant B | |
|---|---|---|---|---|---|---|
| Time | Inoculum | Medium | 50 ppm | 30 ppm | 50 ppm | 30 ppm |
| 5' | loopful | solid | − | − | − | − |
| | | fluid | − | − | − | − |
| 15' | stick | solid | − | − | − | − |
| | | fluid | ± | ± | ± | ± |
| 60' | stick | solid | − | − | − | − |
| | | fluid | − | − | ± | ± |
| 90' | loopful | solid | − | − | − | − |
| | | fluid | − | − | − | − |
| 180' | stick | solid | − | − | − | − |
| | | fluid | − | ± | − | ± |
| 24 hrs | stick | fluid | − | ± | − | ± |

It will be seen that the microorganisms are destroyed employing 50 ppm solutions of either of the sterilants within about one hour.

EXAMPLE 14

Two sets of contact lenses were sterilized with sterilant A and sterilant B, respectively. The lenses were fitted onto rabbits who wore them for eight hours wih no indication of adverse effects or inflammation.

Thus, a method for sterilization of soft, hydrophilic acrylate and methacrylate polymeric materials, particularly in the form of contact lenses, has been illustrated. While various specific examples have been given, the invention should not be considered as so limited, but as encompassing all variations and modifications encompassed within the appended claims. For example, equivalent results are obtained using Potassium Dichloro-s-Triazinetrione and Trichloro-s-Triazinetrione. These materials are also known as potassium dichlorocyanurate and trichloroisocyanuric acid.

I claim:

1. A method for sterilizing a soft, hydrophilic copolymer material, in the form of a contact lens, selected from the group consisting of acrylate and methacrylate copolymers, comprising immersing the material in a solution containing a material which releases active chlorine in solution, but is non-damaging to the eye and to the copolymer material in concentrations effective for sterilization, the active chlorine releasing material being selected from the class consisting of chlorinated trisodium phosphate, sodium dichlorocyanurate, potassium dichlorocyanurate, and trichloroisocyanuric acid, the amount of chlorine released being from 2 to 250 parts per million.

2. The method of claim 1 wherein the chlorine releasing material is chlorinated trisodium phosphate.

3. The method of claim 1 wherein the concentration is from 5 to 100 ppm.

4. The method of claim 1 wherein the contact lens is formed from a copolymer of from 75 to 92% methylmethacrylate and from 8 to 25% acrylic acid, wherein the acid groups of the acrylic acid are neutralized.

5. The method of claim 4 wherein the concentration of the chlorinated trisodium phosphate solution is from 2 to 250 parts per million active chlorine.

6. The method of claim 5 wherein the concentration is from 5 to 100 ppm.

7. The method of claim 1 wherein the contact lens is formed of a material selected from the class consisting of hydroxyalkyl acrylates and hydroxyalkyl methacrylates.

8. The method of claim 7 wherein the concentration of the chlorinated trisodium phosphate solution is from 2 to 250 parts per million active chlorine.

9. The method of claim 1 wherein the chlorine releasing material is sodium dichlorocyanurate.

10. The method of claim 1 wherein the chlorine releasing material is potassium dichlorocyanurate.

11. The method of claim 1 wherein the chlorine releasing material is trichloroisocyanuric acid.

* * * * *